United States Patent
Bredius (10) Patent No.: US 10,786,116 B2
(45) Date of Patent: Sep. 29, 2020

(54) GRINDING UNIT AND COFFEE MACHINE

(71) Applicant: KONINKLIJKE PHILIPS N.V., Eindhoven (NL)

(72) Inventor: Erik Paul Jozef Maria Bredius, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 15/765,837

(22) PCT Filed: Oct. 12, 2016

(86) PCT No.: PCT/EP2016/074381
§ 371 (c)(1),
(2) Date: Apr. 4, 2018

(87) PCT Pub. No.: WO2017/064083
PCT Pub. Date: Apr. 20, 2017

(65) Prior Publication Data
US 2018/0296038 A1    Oct. 18, 2018

(30) Foreign Application Priority Data

Oct. 12, 2015 (EP) .................................. 15189262

(51) Int. Cl.
*A47J 42/50* (2006.01)
*A47J 31/42* (2006.01)
(Continued)

(52) U.S. Cl.
CPC ............... *A47J 42/50* (2013.01); *A47J 31/42* (2013.01); *A47J 42/40* (2013.01); *A47J 42/44* (2013.01); *A47J 42/52* (2013.01); *B02C 25/00* (2013.01)

(58) Field of Classification Search
CPC .. A47J 42/50; A47J 42/42; A47J 42/40; A47J 42/44; A47J 42/52
(Continued)

(56) References Cited

U.S. PATENT DOCUMENTS 4,789,106 A    12/1988  Weber
4,971,259 A    11/1990  Nidiffer
(Continued)

FOREIGN PATENT DOCUMENTS

CN    2684713 Y    3/2005
CN    101377431 A    3/2009
(Continued)

*Primary Examiner* — Faye Francis
(74) *Attorney, Agent, or Firm* — Schott, P.C.

(57) ABSTRACT

A grinding unit (12) for selectively grinding beans (20), in particular coffee beans, is disclosed. The grinding unit comprises a plurality of storage containers (16, 18) for storing the beans (20) and a grinding module (14) associated to the storage containers for grinding the beans. The grinding unit comprises a plurality of shutters (28, 30), wherein each of the shutters is associated to one of the storage containers for feeding the beans from a selected storage container to the grinding module, wherein the shutters are movable with respect to each other to selectively feed the beans from the selected container to the grinding module. An actuation unit (46) is associated to the shutters for actuating the shutters and for opening and closing the storage containers independently. The grinding unit comprises a control unit (32) for controlling the actuation unit in order to open and close the selected storage container and for controlling the grinding module, wherein the control unit is adapted to start driving the grinding module after opening the selected container and to drive the grinding module for a predetermined time period or for a predetermined number of rotations after closing the selected storage container. The control unit is configured to determine said predetermined time (Continued)

period or said predetermined number of rotations, respectively, based on an opening time during which the selected storage container has been open.

9 Claims, 5 Drawing Sheets

(51) Int. Cl.
*A47J 42/40* (2006.01)
*A47J 42/52* (2006.01)
*A47J 42/44* (2006.01)
*B02C 25/00* (2006.01)

(58) Field of Classification Search
USPC ..................................................... 241/34, 36
See application file for complete search history.

(56) References Cited

U.S. PATENT DOCUMENTS

| | | |
|---|---|---|
| 5,186,399 A | 2/1993 | Knepler et al. |
| 5,386,944 A * | 2/1995 | Knepler ............... A47J 42/38 241/6 |
| 5,690,283 A | 11/1997 | Sandolo |
| 5,845,857 A | 12/1998 | Haber et al. |
| 6,349,889 B1 * | 2/2002 | Sandolo ............... A47F 1/035 241/100 |
| 8,690,088 B1 * | 4/2014 | Lassota ............... A47J 42/38 241/100 |
| 8,800,899 B2 * | 8/2014 | Ford ............... A47J 31/42 241/30 |
| 2003/0025012 A1 * | 2/2003 | Lassota ............... A47J 31/42 241/34 |
| 2007/0063079 A1 * | 3/2007 | Ford ............... A47J 31/42 241/30 |
| 2011/0198424 A1 * | 8/2011 | Ford ............... A47J 31/42 241/30 |

FOREIGN PATENT DOCUMENTS

| | | |
|---|---|---|
| DE | 509864 C | 10/1930 |
| DE | 572572 C | 3/1933 |
| WO | 0123095 A1 | 4/2001 |
| WO | 2004098361 A1 | 11/2004 |

* cited by examiner

GRINDING UNIT AND COFFEE MACHINE

This application is the U.S. National Phase application under 35 U.S.C. § 371 of International Application No. PCT/EP2016/074381, filed on Oct. 12, 2016, which claims the benefit of International Application No. 15189262.7 filed on Oct. 12, 2015. These applications are hereby incorporated by reference herein.

FIELD OF THE INVENTION

The present invention relates to grinding unit for selectively grinding beans, in particular coffee beans, stored in a plurality of storage containers. The present invention further relates to a coffee machine including a brewing unit for providing a coffee beverage and a grinding module for grinding coffee beans. The present invention further relates to a method for selectively grinding beans, in particular coffee beans.

BACKGROUND OF THE INVENTION

Fresh Beans Coffee machines are in specific cases equipped with a plurality of storage containers for storing different kinds of coffee beans, wherein the coffee beans of the different containers can be fed selectively to a grinding module in order to grind the different kinds of coffee beans selectively and brew different coffee beverages afterwards. A corresponding coffee machine including two storage containers and a section mechanism for selectively feeding the beans from the different containers to a grinding module is e.g. known from U.S. Pat. No. 4,789,106.

Fresh Beans Coffee machines known from the state of the art use the grinding module for dosing an amount of coffee beans to be grinded based on grinding time and/or rotations per minute. For the case of coffee machines comprising different containers for providing different kinds of coffee beans to the grinding module coffee beans usually remain in a channel between the storage containers and the grinding module and in the grinding module itself so that after switching towards another storage container, the user gets coffee beverage of the remaining beans from the deselected storage container before getting the coffee beverage of the selected storage container.

Further examples of fresh beans coffee machines with a plurality of hoppers for storing different kinds of coffee beans are known from WO 2004/098361 A1, U.S. Pat. Nos. 5,690,283 A, 4,789,106 A and WO 01/23095 A1.

SUMMARY OF THE INVENTION

It is an object of the present invention to provide an improved grinding unit for selectively grinding beans, in particular coffee beans, wherein a precise selection of different beans to be grinded can be achieved. It is further an object of the present invention to provide a corresponding fresh beans coffee machine and a corresponding method for selectively grinding beans.

According to one aspect of the present invention, a grinding unit for selectively grinding beans, in particular coffee beans, is provided comprising:
 a plurality of storage containers for storing the beans,
 a grinding module associated to the storage containers for grinding the beans,
 a plurality of shutters, wherein each of the shutters is associated to one of the storage containers for feeding the beans from a selected storage container to the grinding module, wherein the shutters are movable with respect to each other to selectively feed the beans from the selected container to the grinding module, and
 an actuation unit associated to the shutters for actuating the shutters and for opening and closing the storage containers independently, and
 a control unit for controlling the actuation unit in order to open and close the selected storage container and for controlling the grinding module, wherein the control unit is adapted to start driving the grinding module after opening the selected container and to drive the grinding module for a predetermined time period or for a predetermined number of rotations after closing the selected storage container,
 wherein the control unit is configured to determine said predetermined time period or said predetermined number of rotations, respectively, based on an opening time during which the selected storage container has been open.

According to another aspect of the present invention, a coffee machine is provided, comprising:
 a brewing unit for providing a coffee beverage, and
 a grinding unit according to the invention for providing grinded coffee to the brewing unit.

According to another aspect of the present invention, a method for selectively grinding beans, in particular coffee beans, is provided comprising the steps of:
 storing the beans in a plurality of storage containers,
 selectively opening a selected storage container and feeding the beans from the selected storage container to a grinding module by a shutter associated to the selected storage container,
 driving the grinding module for grinding the beans,
 closing the selected container, and
 driving the grinding module for a predetermined time period or for a predetermined number of rotations after the selected container has been closed,
 wherein said predetermined time period or said predetermined number of rotations, respectively, is determined based on an opening time during which the selected storage container has been open.

Preferred embodiments of the invention are defined in the dependent claims. It shall be understood that the claimed method has similar and/or identical preferred embodiments as the claimed grinding unit, in particular as defined in the dependent claims and as disclosed herein.

The present invention is based on the idea to provide a plurality of shutters to open and close the storage containers containing the beans, wherein the shutters are movable with respect to each other so that the storage containers can be opened and closed individually and independently from each other. By independently opening and closing the respectively selected storage container, the amount of coffee beans fed to the grinding module can be individually determined. Since the grinding module is driven after the storage container has been opened and driven after the storage container has been closed again, all beans provided from the storage container to the grinding module can be grinded and after grinding the beans, no beans remain between a storage container and the grinding module or in the grinding module and, therefore, no deselected beans are grinded after switching to another storage container. Hence, a precise selection and deselection of the beans can be achieved.

According to the present invention, the control unit is adapted to drive the grinding module for a predetermined time period or for a predetermined number of rotations after closing the selected storage container. The predetermined time period or the predetermined number of rotations are aligned to an opening cycle or an opening time of the shutter so that all beans provided during the opening cycle of the shutter to the grinding module are grinded. This is a possibility to precisely adapt the grinding after the shutter has been closed to the amount of beans provided from the storage container. By this a complete consumption of the beans between the storage container and the grinding module can be ensured.

In a preferred embodiment, the shutters are each formed as a flap disposed at least partially between the storage containers. This is a possibility to open and close the storage containers with low technical effort and to feed the beans from the storage containers to the outlet opening by means of their own weight.

In a preferred embodiment, each of the shutters is pivotably mounted around a shutter-pivot-axis. This is a possibility to mount the shutters with low technical effort.

In a preferred embodiment, the shutters are pivotably mounted one shutter-pivot-axis. This is a possibility to actuate the different shutters with low technical effort.

In a preferred embodiment, each of the shutters comprises an actuation portion and the actuation unit comprises a cam element associated to the actuation portions for actuating the shutters. This is a possibility to precisely actuate the shutter individually and/or independently.

In a preferred embodiment, the cam element is a rotational cam element rotationally mounted around a cam axis. This is a possibility to actuate the shutters with low technical effort.

In a preferred embodiment, the cam element comprises two cam portions each associated to the actuation portion of one of the shutters for individually actuating the shutters. This is a possibility to further reduce the technical effort for actuating the shutters and for alternatively actuate the shutters.

In a preferred embodiment, the actuation unit comprises an electrical drive for actuating the cam element. This is a possibility to precisely open and close the containers by actuating the shutters, since the cam element can be precisely controlled on an electrical basis.

In a preferred embodiment, an outlet opening of the storage containers is associated to a dosing chamber for receiving the beans from the selected container. This is a possibility to provide a defined dosing amount of beans to the grinding module.

In a preferred embodiment, the control unit is adapted to count an amount of beans provided to the grinding unit on the basis of a number of rotations of the grinding unit. The control unit is preferably further adapted to close the selected storage container after a predetermined number of beans has been provided from the storage container to the grinding module. This is a possibility to precisely determine an amount of beans needed for the coffee beverage.

As mentioned above, the grinding unit can provide individually a precise amount of coffee beans from the storage container to the grinding module since the containers can be individually opened and closed by the shutters which are movable with respect to each other. Due to the actuation unit, which is controlled by the control unit, the grinding module can be activated when the selected container is opened and can be driven for a predetermined time period after the selected container is closed so that no beans remain between the storage container channel and the grinding module and in the grinding module itself after the grinding procedure. Hence, after deselecting a storage container, a mix of beans from the different storage containers can be avoided.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
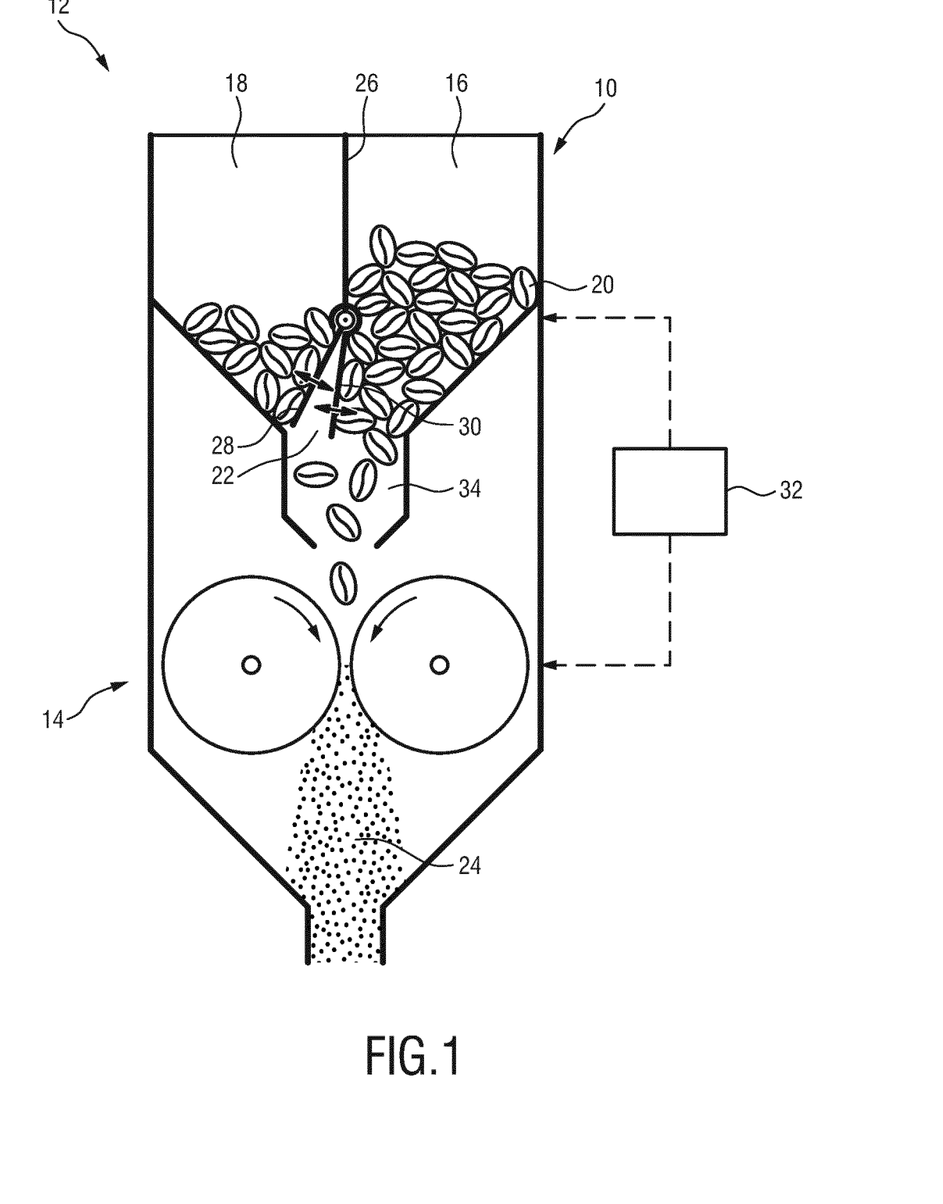
FIG. 1 shows a schematic illustration of a grinding unit for a coffee machine.

FIG. 1 shows a schematic sectional view of a grinding unit which is generally denoted by 10. The grinding unit 10 is part of a coffee machine 12 which includes a grinding module 14 and two storage containers 16, 18 for storing coffee beans 20 to be fed to the grinding module 14. The storage containers 16, 18 are disposed above the grinding module 14 so that the coffee beans 20 can slip by means of their own weight through an outlet opening 22 to the grinding module 14, wherein grinded coffee 24 is fed to a brew unit (not shown) in order to produce a coffee beverage.

The storage containers 16, 18 are separated by a vertical separating wall 26. The grinding unit 10 comprises two movable shutters 28, 30 disposed between the separating wall 26 and the outlet opening 22. The shutters 28, 30 are movably mounted in order to close or open the storage containers 16, 18. The shutters 28, 30 are independently movable with respect to each other so that the storage containers 16, 18 can be opened or closed alternatively or selectively and the beans 20 of one of the storage containers 16, 18 can be fed to the outlet opening 22 and to the grinding module 14, respectively. Hence, different kinds of coffee beans stored in the storage containers 16, 18 can be selected to produce a coffee beverage. The shutters 28, 30 are formed as pivotable flaps, which are adapted to close both storage containers 16, 18 and to open one of the storage containers 16, 18 independently of the position of the respective other shutter 28, 30.

The shutters 28, 30 are movable to the different positions by means of an actuation unit (not shown) which is actuated by means of an electrical drive. The actuation unit and the grinding module 14 are controlled by means of a control unit 32 in order to align the actuation of the shutters 28, 30 and the grinding of the grinding module 14.

During the production of the grinded coffee 24 and the corresponding coffee beverage, one of the shutters 28, 30 is selectively actuated to open one of the storage containers 16, 18 to provide the coffee beans 20 to the grinding module 14. The respective shutter 28, 30 is open for a predetermined time period so that a predetermined amount of coffee beans 20 is provided to a dosing chamber 34 between the storage containers 16, 18 and the grinding module 14 and to the grinding module 14, respectively. The grinding module 14 is activated after the respective shutter 28, 30 has been opened and is driven for a predetermined time period after the respective shutter 28, 30 has been closed. Alternatively, the grinding module 14 is driven for a predetermined number of rotations after the respective shutter 28, 30 has been closed. Since the shutters 28, 30 are movable independently with respect to each other, both containers 16, 18 can be closed and the grinding module 14 is able to grind all coffee beans 20 provided from the storage container and to the dosing chamber 34 and remaining in the dosing chamber 34 after the respective storage container 16, 18 has been closed. Hence, the channel between the storage containers 16, 18 and the grinding module 14 is empty after the selected coffee beans 20 of one of the storage containers 16, 18 has been grinded and only selected coffee beans 20 are provided to the grinding module 14 for a following production of a coffee beverage. Hence, a precise dosing and a precise selection of coffee beans 20 can be achieved.

The predetermined amount of rotations or the predetermined time for which the grinding module 14 is driven after the storage container has been closed by the shutter is aligned to the opening cycle or the opening time of the shutter 28, 30. The predetermined amount of rotations or the predetermined time are determined so that all beans 20 provided during the opening cycle or the opening time of the shutter 28, 30 are grinded and the dosing chamber 34 is empty when the grinding module 14 is deactivated or switched off.

The control unit 32 is further adapted to count an amount of coffee beans 20 provided to the grinding unit 14 on the basis of a number of grinding rotations of the grinding unit 14 for grinding the coffee beans 20. The control unit 32 closes the selected storage container by actuating the respective shutter 28, 30 after a predetermined amount of beans has been provided from the storage container to the grinding module. This is a possibility to determine an amount of beans needed for the coffee beverage.

Figure 2A:
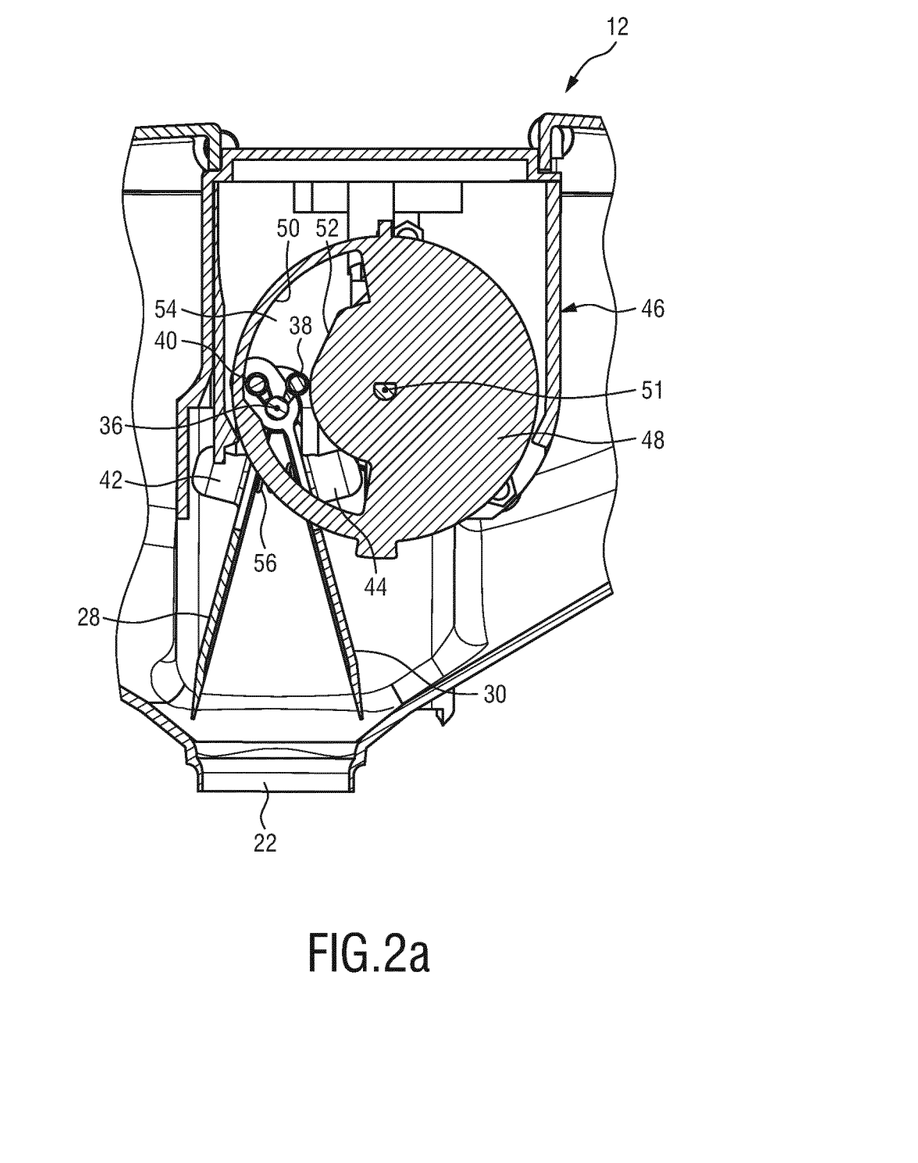
FIG. 2a, b show detailed illustrations of the two shutters of the grinding unit in different positions.
Figure 2B:
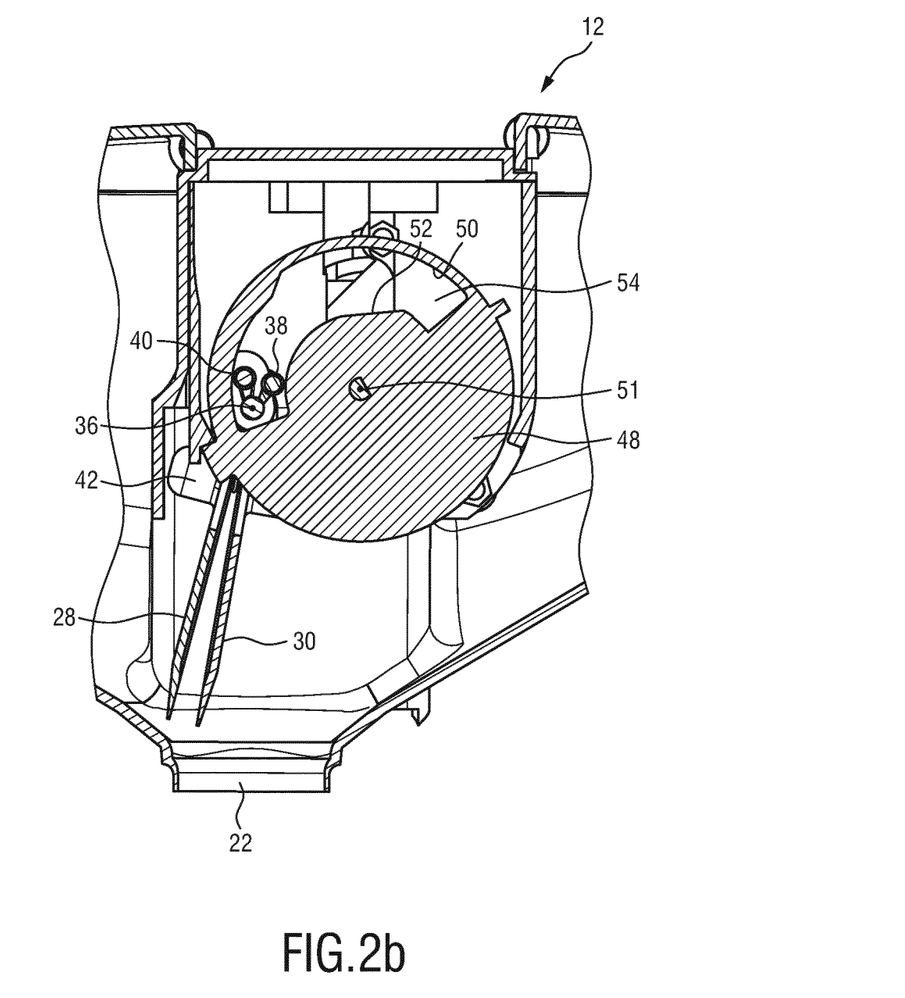

FIGS. 2a and b show a schematic sectional view of the grinding unit 10. The shutters 28, 30 are pivotably mounted around a shutter-pivot-axis 36. The shutters 28, 30 each comprise an actuation portion 38, 40 for actuating the respective shutter 28, 30 and to open and close the storage container 16, 18, respectively. The shutters 28, 30 each comprise a dampening element 42, 44, which forms a stop for the respective shutter 28, 30 in a corresponding closing position. An actuation unit 46 is associated to the actuation portions 38, 40 in order to actuate the shutters 28, 30 individually and independently from each other.

The actuation unit 46 comprises a cam element 48, which is in this embodiment formed as a rotational cam element 48. The cam element 48 comprises a first cam portion 50 and a second cam portion 52, which are respectively associated to the actuation portions 38, 40 in order to actuate the respective shutter 28, 30 dependent on a rotational position of the cam element 48. The cam portions 50, 52 are formed so that the shutters 28, 30 are either both in a closed position as shown in FIG. 2a or one of the shutters 30 is in an open position wherein the respective other shutter 28 is in a closed position as shown in FIG. 2b.

The cam portions 50, 52 are formed on opposite edges of a rotational slit 54 or a rotational recess 54 of the cam element 48. The cam element 48 is rotated or driven by means of an electric drive (not shown). The cam element 48 is rotatably mounted around a cam rotation axis 51, which is disposed parallel to the shutter-pivot-axis 36 and parallely offset to the shutter-pivot-axis 36. A spring element 56 is disposed between the shutters 28, 30 which preloads the shutters 28, 30 with respect to each other and forces the shutters 28, 30 in a closed position for closing the storage containers 16, 18.

The actuation unit 46 and the grinding module 14 are controlled by means of the control unit 32, wherein the grinding of the grinding module 14 is aligned to the actuation unit 46 and to the opening cycle of the respective storage container 16, 18. The grinding module 14 is activated after the storage container 16, 18 has been opened and the grinding module 14 is driven after the selected storage container 16, 18 has been closed for the predetermined time period or the predetermined amount of rotations as mentioned above.

Figure 3:
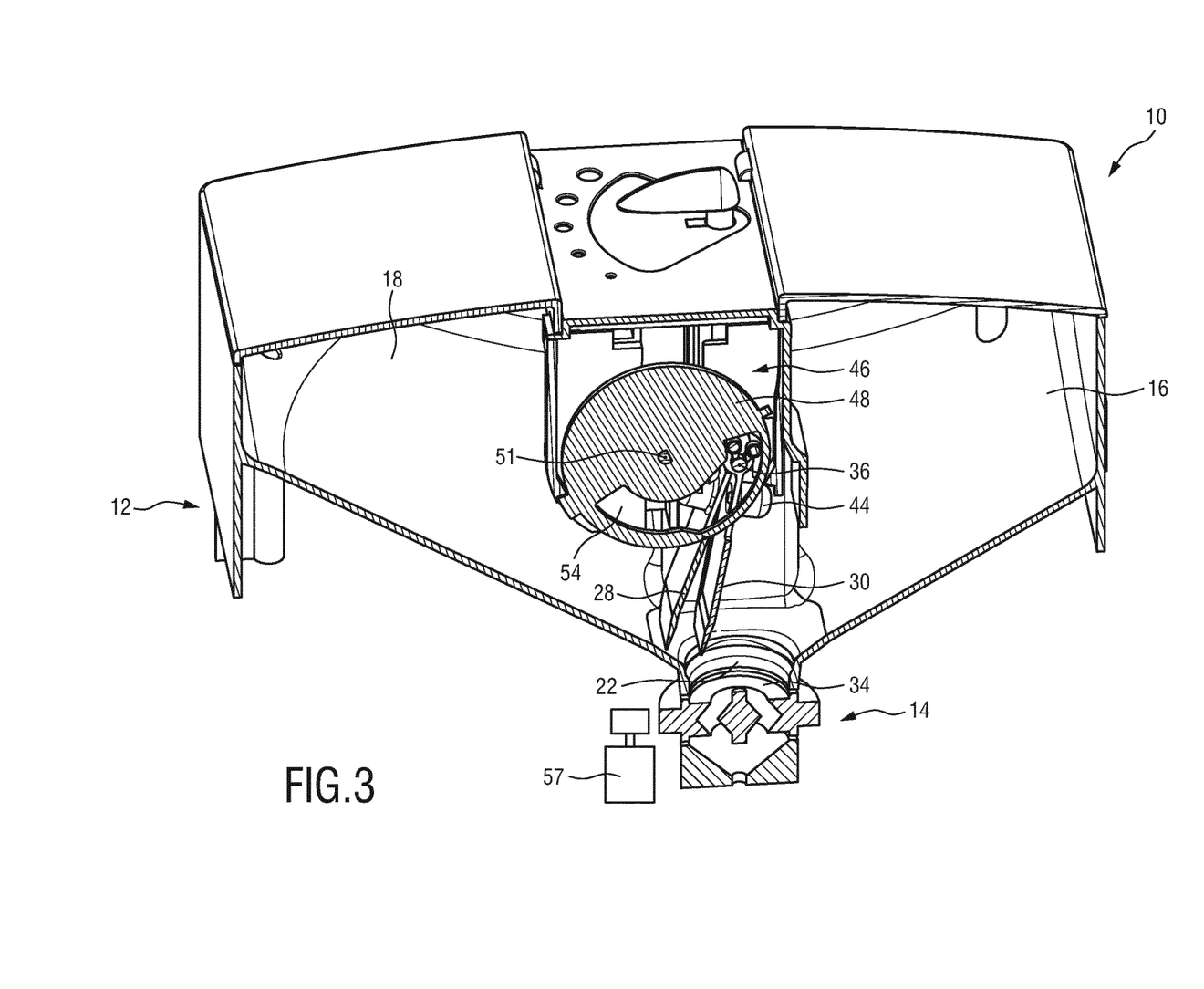
FIG. 3 shows a perspective view of a grinding unit for feeding beans from two different storage containers to a grinding module.

FIG. 3 shows a sectional view of the grinding unit 10 including the grinding module 14 for grinding the coffee beans 20.

The grinding module 14 comprises an electrical drive 57 for driving grinding wheels of the grinding module 14. The dosing chamber 34 is formed between the outlet opening 22 and the grinding module 14, wherein the dosing chamber 34 is shared by the two storage containers 16, 18 and is disposed between the two storage containers 16, 18 and the grinding module 14.

After opening one of the storage containers 16, 18 by actuating the respective shutter 28, 30, the dosing chamber 34 is filled with beans 20 and the grinding module 14 driven by the electrical drive 57 grinds the coffee beans 20. After a predetermined time period, the respective shutter 28, 30, in this case shutter 30 is closed again by rotating the cam element 48 to a middle position, in which both storage containers 16, 18 are closed, so that a predetermined amount of coffee beans 20 is provided to the dosing chamber 34 and to the grinding module 14, respectively. After closing the respective storage container 16, 18, the electric drive 57 continuous to drive the grinding module 14 in order to grind all coffee beans 20 disposed in the dosing chamber 34.

Since the dosing chamber is in any case empty after the grinding module 14 is stopped, no mixing of different coffee beans from the different storage containers 16, 18 can occur and a precise dosing and a precise separation of the different coffee beans 20 can be achieved.

In a further embodiment, the grinding module 14 starts to grind the beans 20 and the control unit 32 counts the amount of coffee beans 20 grinded by the grinding unit 14 on the basis of a number of grinding rotations of the grinding unit 14. After a predetermined amount of beans 20 needed for the coffee beverage has been grinded by the grinding module 14, the control unit 32 closes the selected storage container again by actuating the respective shutter 28, 30. The grinding module 14 stops grinding after the dosing chamber 34 is empty as described above.

Figure 4:
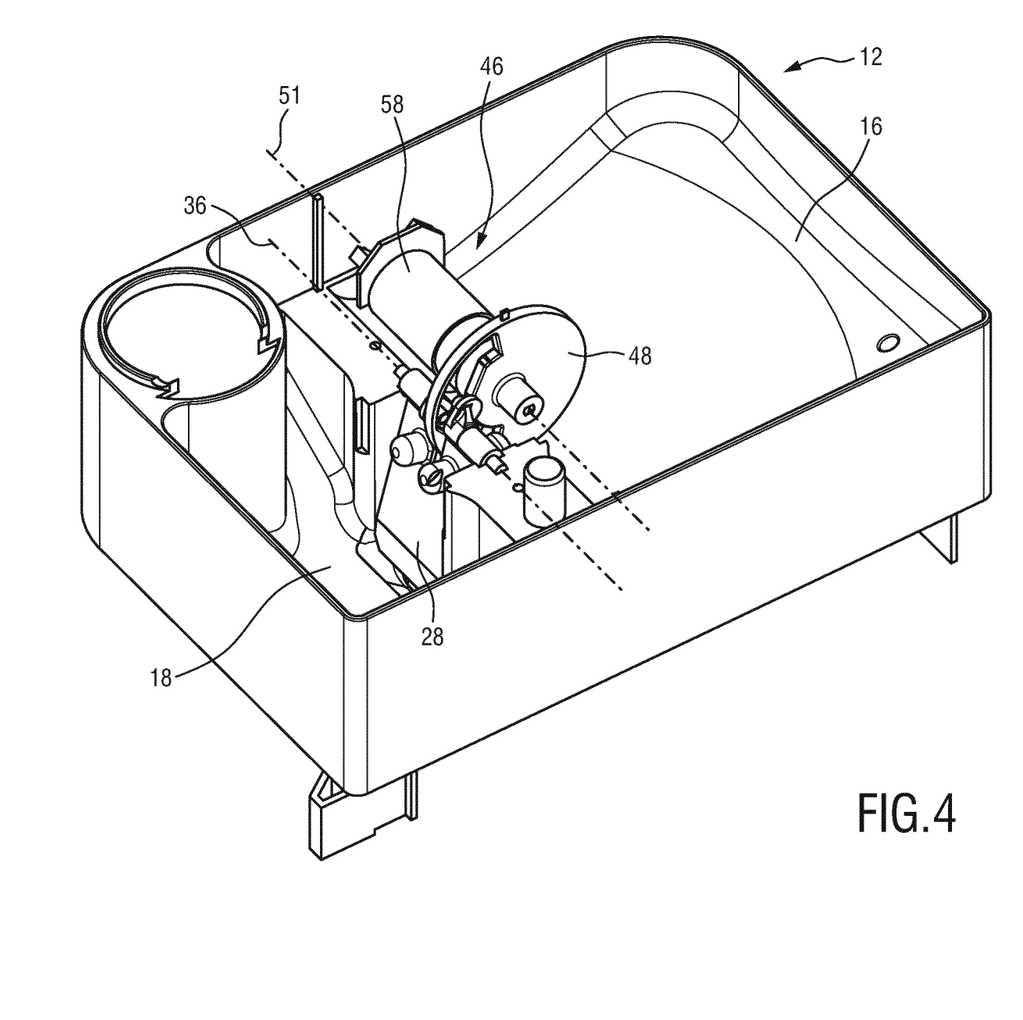
FIG. 4 shows a perspective view of an actuation unit for actuating two shutters of the grinding unit.

In FIG. 4 a partial view of the actuation unit 46 and the storage containers 16, 18 is schematically shown. The actuation unit 46 comprises an electric drive 58 which is connected to the cam element 48 for rotating the cam element 48. The electric drive 58 is controlled by the control unit 32 and rotates the cam element in three different predefined positions. In a middle position of the cam element 48 both shutters 28, 30 are closed and in the end positions of the cam element 48 one of the shutters 28, 30 is opened and the respective other is closed. The cam rotation axis 51 and the shutter-pivot-axis 36 are disposed in parallel to each other and parallely offset to each other as shown in FIG. 4.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an"

does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A grinding unit for selectively grinding coffee beans, the grinding unit comprising:
   a plurality of storage containers for storing the coffee beans,
   a grinding module associated to the plurality of storage containers for grinding the coffee beans,
   a plurality of shutters, wherein each of the shutters is associated to one of the plurality of storage containers for feeding the coffee beans from a selected storage container, of the plurality of storage containers, to the grinding module, wherein the plurality of shutters are movable with respect to each other to selectively feed the coffee beans from the selected storage container to the grinding module, and
   an actuation unit associated to the plurality of shutters for actuating the plurality of shutters and for opening and closing the plurality of storage containers independently, and
   a control unit for controlling the actuation unit in order to open and close the selected storage container and for controlling the grinding module, wherein the control unit is adapted to start driving the grinding module after opening the selected storage container and to drive the grinding module for a predetermined time period or for a predetermined number of rotations after closing the selected storage container,
   wherein the control unit is configured to determine said predetermined time period or said predetermined number of rotations, respectively, based on an opening time during which the selected storage container has been open.

2. The grinding unit as claimed in claim 1, wherein the plurality of shutters are pivotably mounted to one shutter-pivot-axis.

3. The grinding unit as claimed in claim 1, wherein each of the plurality of shutters comprise an actuation portion, and wherein the actuation unit comprises a cam element associated to the actuation portions for actuating the plurality of shutters.

4. The grinding unit as claimed in claim 3, wherein the cam element is a rotational cam element rotationally mounted around a cam-axis.

5. The grinding unit as claimed in claim 3, wherein the cam element comprises two cam portions each associated to the actuation portion of one of the plurality of shutters for independently actuating the plurality of shutters.

6. The grinding unit as claimed in claim 3, wherein the actuation unit comprises an electric drive for actuating the cam element.

7. The grinding unit as claimed in claim 1, wherein the control unit is adapted to count an amount of coffee beans provided to the grinding unit based on a number of rotations of the grinding unit.

8. A coffee machine, comprising:
   a brewing unit for providing a coffee beverage, and
   a grinding unit as claimed in claim 1 for providing grinded coffee to the brewing unit.

9. A method for selectively grinding coffee beans, comprising the steps of:
   storing the coffee beans in a plurality of storage containers,
   selectively opening a selected storage container, of the plurality of storage containers, and feeding the coffee beans from the selected storage container to a grinding module by a shutter associated to the selected storage container,
   driving the grinding module for grinding the coffee beans,
   closing the selected storage container, and
   driving the grinding module for a predetermined time period or for a predetermined number of rotations after the selected storage container has been closed,
   wherein said predetermined time period or said predetermined number of rotations, respectively, is determined based on an opening time during which the selected storage container has been open.

* * * * *